United States Patent [19]
Bodenkamp et al.

[11] Patent Number: 5,243,447
[45] Date of Patent: Sep. 7, 1993

[54] ENHANCED SINGLE FRAME BUFFER DISPLAY SYSTEM

[75] Inventors: Jens Bodenkamp, Palo Alto; Mark Atkins, Santa Clara, both of Calif.

[73] Assignee: Intel Corporation, Santa Clara, Calif.

[21] Appl. No.: 901,519

[22] Filed: Jun. 19, 1992

[51] Int. Cl.$^5$ .................... G09G 1/14; H04N 5/270
[52] U.S. Cl. .................... 345/133; 358/183; 345/116
[58] Field of Search ............ 340/747, 703, 748, 721; 358/183, 22, 149, 462

[56] References Cited

U.S. PATENT DOCUMENTS

| | | | |
|---|---|---|---|
| 4,149,184 | 4/1979 | Giddings | 358/81 |
| 4,536,856 | 8/1985 | Hiroishi | 364/900 |
| 4,855,813 | 8/1989 | Russell | 358/183 |
| 4,947,257 | 8/1990 | Fernandez | 358/183 |
| 5,021,873 | 6/1991 | Abumi | 358/21 R |
| 5,027,212 | 6/1991 | Marlton | 340/703 |
| 5,089,811 | 2/1992 | Leach | 340/703 |

FOREIGN PATENT DOCUMENTS

2171875  9/1986  United Kingdom .

*Primary Examiner*—Alvin E. Oberley
*Assistant Examiner*—Minsun Oh
*Attorney, Agent, or Firm*—Blakely, Sokoloff, Taylor & Zafman

[57] ABSTRACT

An enhanced single frame buffer video display system is described for combining both video and graphical images. A single frame buffer is implemented which stores a single data format for pixel types which may be interpreted by a conventional video generator for output to conventional color graphics computer display devices. The system utilizes an enhanced graphics controller which does all pixel processing for translating all incoming graphics and video data to a single format type as well as performing, blending and scaling. The system is readily scalable for handling additional format data types.

22 Claims, 5 Drawing Sheets

ENHANCED SINGLE FRAME BUFFER DISPLAY SYSTEM

BACKGROUND OF THE INVENTION

1. Field of the Invention

The present invention relates to an apparatus for displaying computer output. More particularly, the present invention relates to an apparatus for displaying multiple types of information on computer display devices.

2. Art Background

Human beings can be thought of as having to process visual information divided into four categories. These comprise images for natural stills and video for natural movies. Additionally, the synthetic still visual type is constituted by graphical images while synthetic movies can be considered animation. It is these four visual data types for the human I/O road map with which computer designers must come to grips in maximizing the amount of information that can be conveyed to computer users. Traditionally, computer designers have designed systems to accommodate only one or two of these visual data types requiring high additional costs if it became necessary to incorporate the remaining types of information. The challenge, therefore, for computer systems designers is to design systems which though fully integrated, are scalable or expandable to handle the increasing visual needs of computer users.

Computer display devices are essential for conveying information to computer users. The information displayed to the user can take many forms. For example, it may be useful to display information in terms of alphanumeric characters, graphical images or even full motion video. In any of these forms, the user seeks to maximize the quantity and quality of information that is output to the display, as well as maximizing the speed at which the information is displayed. Human computer users tend to absorb and manipulate information more quickly when it is presented in a graphical form, rather than in alphanumeric form, likewise with video. The increased use of visual images thus creates a better environment for conveying information to the user. The optimal computer system thus needs to be able to manipulate alphanumeric-type information and graphical information with relative ease as well as being able to incorporate video information.

It has also been determined in the computer industry that the use of color tends to increase the amount of information presented to the computer user. Both graphical information and video can be enhanced by the effective use of color. Thus, in addition to being able to process multiple types of information, for purposes of conveying large amounts of information, the ability to manipulate color and other attributes with that information is essential.

Unfortunately, the ability to display information in multiple formats with multiple colors and other attributes comes with the expense of increasingly complicated hardware. In conventional computer display systems, images are stored in a large block of memory allocated for the display screen. In this display screen memory, each memory location is matched to a corresponding picture element (pixel) on the display system. This block of memory is generally referred to as a frame buffer. The data stored in the frame buffer is then used by a display generator which reads the frame buffer and repeatedly scans the output device on which the image is to be shown. The format of the data in the frame buffer is usually of a single type which corresponds to the type of information to be displayed. That is, for conventional graphical information, the block of data corresponding to each given pixel on the output display will be, for example, in the RGB color format or an index value to a color lookup table (CLUT) which stores RGB data. The RGB format is one which corresponds the color information for the pixel which it represents as defined in a three-dimensional color space. The RGB digital data is translated into analog control information for three different raster guns, each dedicated to a single color which combine to form the desired color of the pixel at the particular point on the screen.

The data in the frame buffer is maintained such that there is a direct correspondence of succeeding memory elements to succeeding screen pixels. Serial reading of the frame buffer results in rendering the stored image by having the raster guns follow the scan lines of the display device. Obviously, because color information is stored in the frame buffer, more than one bit of information is required to control how a given pixel is rendered. The more detailed information desired for the pixel, the more memory that is required to be maintained for each pixel in the frame buffer. It has been determined that 24 bits of information are required to identify the color for each pixel to accommodate the color resolving power of the human eye. The more realistic an image that is required, the larger amount of memory that is necessary for the frame buffer.

When it is desired to combine graphics data with video data, the hardware requirements are further complicated. The data format for video information is usually different from that of graphics information. Recently, in order to combine stored graphics and video on a single output display, graphics systems have been designed using two frame buffers. One frame buffer is used for storing a graphical image, the other is used for storing a video image. Each frame buffer has a corresponding memory location for each pixel on the output display. The use of two frame buffers storing different formatted data requires two different video generators which can translate the respective data types into the controls for driving the raster guns of the display. Further, additional logic is required for combining the images which determines whether the graphics pixel data or video pixel data will be displayed at each pixel location. The conventional method for this logic is to use the concept of chroma-keying, whereby if the graphic image is of a certain color, then the video data will be displayed at those locations.

Obviously, the use of dual frame buffers as well as multiple video generators and compositing logic as discrete elements increases the amount of hardware and therefore costs required for processing combined graphics and video images. It also limits the flexibility of the design to be scaled to new technologies. The increased cost results from the duplication of frame buffers which require twice the memory for each pixel to be displayed and two separate video generators for translating the two data formats. Additional complications in combining graphics and video arise because graphic images and video images require refreshing at different rates.

One approach that has been used to reduce the hardware requirements and therefore, costs of composite graphics and video systems is the use of a dual-mode frame buffer. Such a frame buffer combines into a single memory system the storage space for both graphics and video data. However, it still requires duplicate memory for each pixel location, though, as a single memory only one memory controller is required for the frame buffer. Another approach is to use a single frame buffer having only a single memory location corresponding to each pixel location but which can store different formats of data for each pixel location. The disadvantage of this is that a lot of memory is wasted because each memory location has to be able to store data of potentially the largest data type. Also, the memory for each pixel will need to be further extended to hold tagging information which identifies what format each block of pixel data is in. Further, the display generator circuitry must then be able to decode the multiple formats of information for driving the output display.

It would be a great advantage and, is therefore an object of the present invention, to provide a display system which uses a single frame buffer for storing data of a single data type, a single video generator which is responsive to that data format type for driving an output display while still being able to display both video and graphic information.

SUMMARY OF THE INVENTION

It is an object of the present invention to provide a computer display system which is capable of combining both graphical and video information while minimizing the hardware requirements for such a system.

It is also an object of the present invention that such a system be capable of accommodating multiple source pixel formats of a source image while using a single data type for driving the display output.

It is further an object of the present invention to provide a fully integrated display system which does not require wholesale redesign when additional data formats are devised for image processing.

These and other objects of the present invention are provided in a computer display system in which a single frame buffer is utilized for storing only a single pixel format type which may be interpreted by a conventional digital-to-analog converter (DAC) for generating analog control signals for driving a raster display device. The system comprises a modular graphics controller which receives source pixels of varying formats and performs all translations and manipulations and programs the frame buffer with the single rendering data format. The graphics controller of the present invention is capable of translating pixel formats from standard RGB, Yuv, Color Index and other pixel format types, manipulating them and yielding an output format type of a uniform kind for the frame buffer. When additional format types are desired or developed, the system need not be completely redesigned, thereby allowing for an easily expandable, fully integrated computer display control system. The display system of the present invention minimizes the amount of memory that must be used for frame buffers as well as simplifying the hardware required for generating the image stored in the frame buffer to the output display device.

DETAILED DESCRIPTION OF THE INVENTION

An apparatus for generating, manipulating and compositing graphical and video images for display on computer output devices is described. In the following detailed description, numerous specific details are set forth such as specific computer components, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention.

Figure 1:
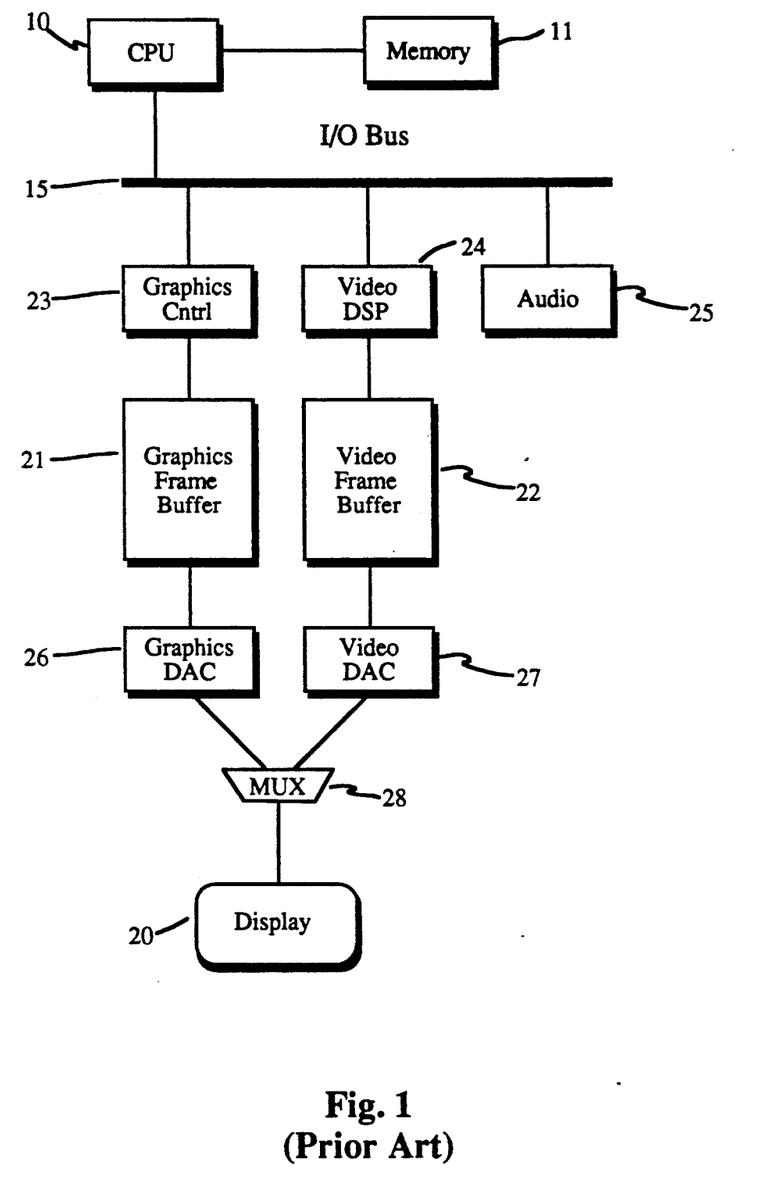
FIG. 1 shows a prior art graphics system which requires for each pixel format type individual controllers, frame buffers and generating circuitry as well as compositing logic for outputting to display devices.
Figure 2:
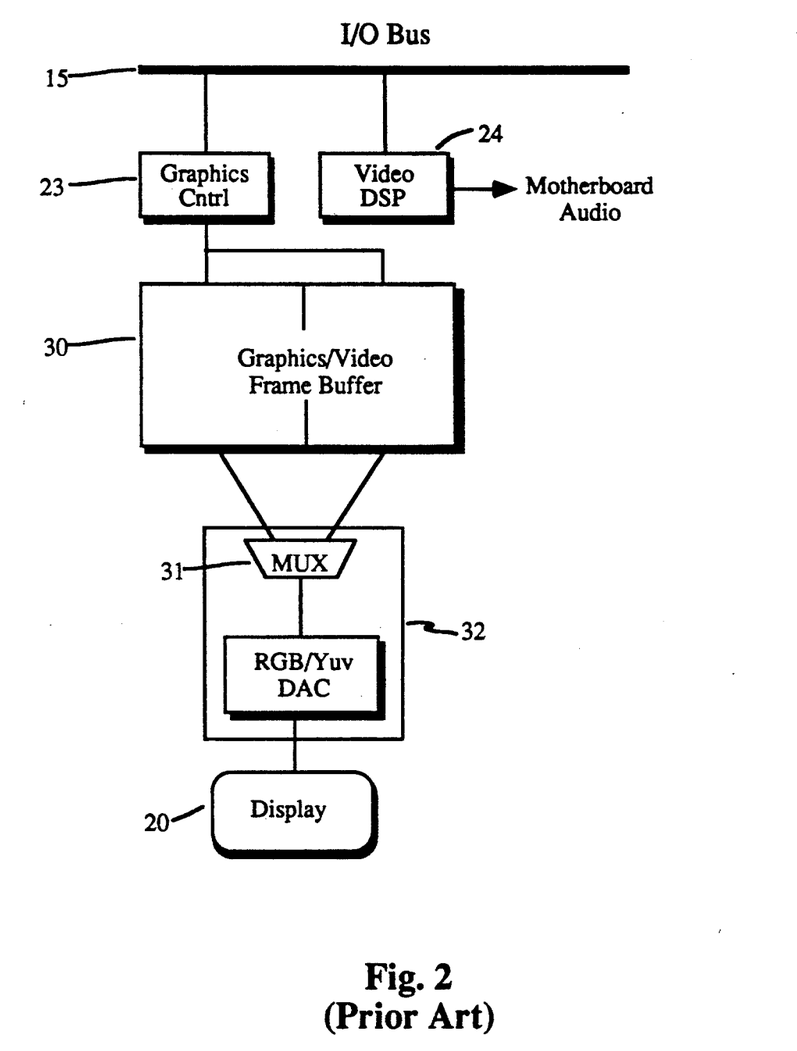
FIG. 2 illustrates a block diagram of an alternative prior art device in which a single frame buffer is used for which only a single controller is required, but which stores multiple data formats and requires complicated hardware for processing the stored frame buffer data.

FIGS. 1 and 2 illustrate prior art computer display controllers. FIG. 1 is illustrative of the traditional, low integration approach which may be characterized in that separate circuitry domains are required for each pixel format type desired to be shown on the display. The display controller of FIG. 1 is shown being employed in conventional computer architecture in which a CPU 10 communicates with a memory subsystem 11 and utilizes an I/O bus 15. The computer's output is ultimately to be rendered on the display 20. The CPU 10 performs manipulations and calculations on data stored in the memory system 11. The memory system 11 may be any of several types including semiconductor RAM, magnetic disk, optical disk, video and audio tapes or a combination of several such devices. The data format for the image to be displayed is often dictated by the type of information embodied. That is, a number of color-space models lend themselves more appropriately to graphics information while various luminescence-based models are more appropriate for video information.

Most computer output display devices are raster monitors which use color raster guns for creating images on a screen's phosphorous panel. Ultimately whatever data type is being manipulated internally will have to be translated to the data type appropriate for the display device 20. In the preferred embodiment of the present invention it will be assumed that the color model required for rendering on the display 20 is the RGB color model for raster graphics systems. Of course, those skilled in the art will recognize that the present invention may be applied regardless of the color model required for display. Numerous color models have been devised, each with varying strengths and weaknesses in the appropriateness for computer displays. For a thorough description of various models, see Section 13.3 of *Computer Graphics Principles and Practice*, 2d. ed. Foley, Van Dam, Feiner and Hughes, Addison Wesley, 1987. With respect to video data, it will be assumed for purposes of the present invention's preferred embodiment that the Yuv data format is utilized. Again, numerous other video data formats are known and may be referenced further herein.

Referring again to FIG. 1, there is shown an example of a low integration dual frame buffer display controller configuration. The system is considered low integration in that graphic data and video data for display purposes are loosely coupled. Separate frame buffers are maintained, the graphics frame buffer 21 and the video frame buffer 22. Thus, two storage elements are associated with every pixel on the screen. The graphics frame buffer 21 will be maintained with data in the RGB or CLUT format and driven by the graphics controller 23. The graphics frame buffer will have associated with each pixel to be displayed a number of bits of memory indicating the associated address in the RGB color model which correspond to the color for the pixel. For true color, 24 bits may be required just for the color information for each pixel. Further, each pixel block of memory in the frame buffer may have associated with it a number of bits indicating output information for blending. Similarly, the video frame buffer 22 maintains storage elements associated with every pixel on the screen. In the video case, for each pixel on the screen the storage element will have the number of bits required for the Yuv description at that location. The video frame buffer 22 is driven by a pixel processor 24 which in the case of the prior art embodiment of FIG. 1 is a video digital signal processor.

In both the prior art display controllers and the present invention, audio is treated separately, in a discrete audio processor 25. The audio portion of video data will have to be in some way coordinated with the video signals when desired.

In addition to requiring separate frame buffers for graphics and video data, separate DACs are needed for outputting the graphics data and video data during refresh of the display 20. The graphics DAC 26 converts the stored RGB graphics data from the frame buffer 21 into analog signals for driving the raster guns of the display 20. There are number of commercially available graphics digital-to-analog converters capable of efficiently performing this function.

Because the video data is stored in a frame buffer using a different data format type than the graphics frame buffer, a second DAC 27 is needed for translating the Yuv data into RGB color space or whatever other color space is being utilized for the display 20. The DAC 27 for the video data has to be synchronized with the graphics data video generator which introduces hardware complications at the outer end of the output control architecture. Also required in a conventional low integration approach is multiplexing logic 28 which determines which frame buffer's data is to be displayed for each pixel location. Conventionally, the decision whether to display a graphics or video pixel is based on a technique called "chroma keying" in which the graphics signal is displayed unless the graphics signal is a designated color in which case the video information is displayed.

Obviously, the conventional prior art system of FIG. 1 is not easily adaptable or designed to incorporate additional data types. Additional hardware will need to be developed and coordinated, and possibly additional frame buffers adding great expense to systems and overhead to systems which use them.

One approach for reducing the hardware demands without impacting performance is illustrated in FIG. 2.

The approach in FIG. 2 is to integrate a number of the components into single component blocks. For example, a single frame buffer 30 is utilized, but one which maintains two blocks of memory, one for graphics and one for video. This simplifies the controller requirements and synchronizing requirements but still requires that there be enough memory such that two storage elements are associated with every pixel on the screen. Multiplexing logic 31 is still required for selecting which block, whether graphics or video, is to be displayed at a given pixel location. In this prior art embodiment, a single DAC 32 is used, but one which can identify the data format, whether RGB or Yuv, and appropriately translate it into the required analog signals for driving the raster guns of the display. The DAC 32 utilized in this alternative prior art embodiment incorporates multiplexing logic 31 for determining which portion of the memory of the frame buffer 30 is to be displayed at each pixel. In this prior art embodiment, the video signal processor 24 passes the video signal through the I/O bus to the graphics control 23 which passes the video signal through to the video portion of the frame buffer.

The prior art display controller of FIG. 2 while improving over the traditional low integration approach of FIG. 1, still suffers disadvantages. More memory is required for the frame buffer than is needed for any given screen display, at considerable expense. Further, the compositing logic and digital-to-analog conversion logic must still be specially coordinated and still reside at the high-clock rate outer end of the hardware hierarchy.

Figure 3:
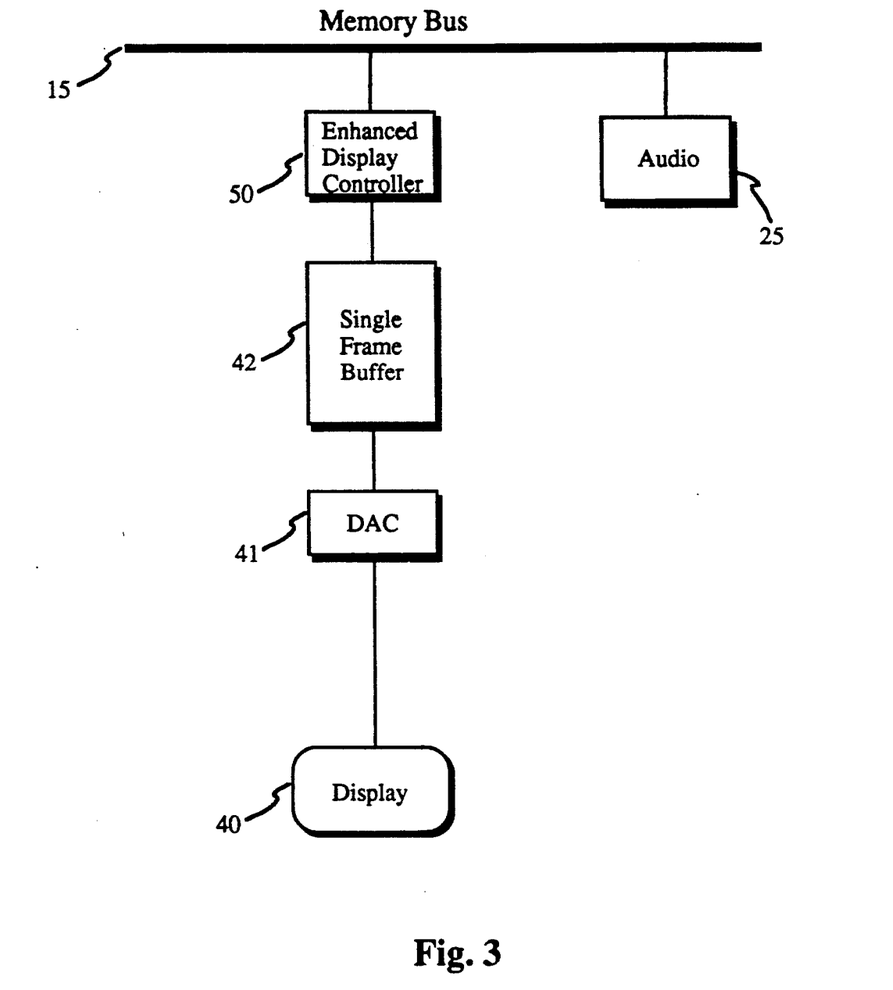
FIG. 3 illustrates the display system of the present invention with simplified overall modular layout.

FIG. 3 illustrates the architectural design of the display controller in accordance with the present invention. As can be seen, the overall architectural system is greatly simplified from those of the prior art. In this invention, the lowest level of the architecture from the display 40, digital-to-analog converter 41 and frame buffer 42 may be selected to minimize new design complications. That is, regardless of the data types which are processed, a single format type will be stored in a single frame buffer in which a single storage element will correspond to a single output display pixel. The DAC converter 41 of the present invention need only be the simplest type for converting the desired stored data type from the frame buffer for driving the raster guns of the corresponding color space for the display 40. In the architecture of the present invention, it is the display controller 50 which does all the processing and compositing of the graphics and video data to be displayed.

Figure 4:
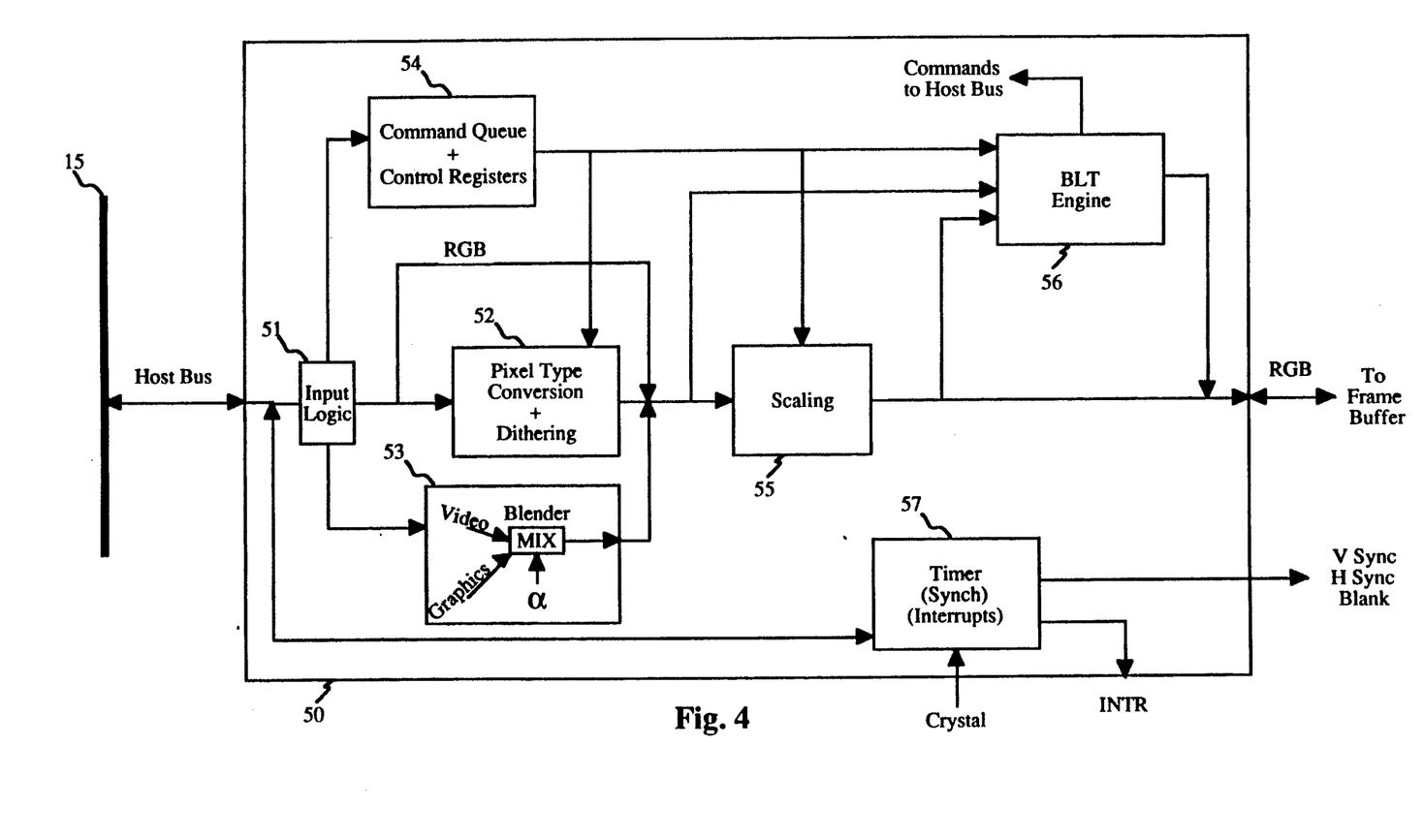
FIG. 4 illustrates a block diagram of the enhanced controller for driving the display system of the present invention.

Referring now to FIG. 4, the display controller 50 is shown with its constituent modules identified. Graphic and video data are conveyed on the bus 15 to the display controller 50. Input logic 51 determines how the input data stream should be propagated. Graphic and video data, in contrast with commands and control register values, are propagated to the conversion and dithering block 52. The conversion and dithering block 52 performs color space translation or look-up table functions, etc. depending on the format type of the received pixel data. The conversion and dithering circuit block 52 is described in more detail with respect to FIG. 5 further herein.

Blending logic 53 in the display controller 50 performs the compositing functions for the graphics and video signals using any alpha channel information to control the compositing. The compositing method applied by the blender 53 may follow traditional chromakeying or any other desired graphic/video combining scheme. Alpha channel application is well-known and relates to dictating intensity levels and the like for indicating the amount of coverage a particular pixel is subject to. For more information on the use of alpha, see T. Porter and T. Duff, "Compositing Digital Images," SIGGRAPH 84, pp. 253-259.

Command queue and control register circuitry block 54 receives the non-graphics/video data stream and controls device configuration and interprets high-level drawing requests from the CPU or a video digital signal processor.

Also included in the display controller 50 is scaling circuitry 55 which is subject to control from the command queue circuitry 54. The scaling block 55 is capable of translating the converted pixel data to an appropriate image size corresponding to the desired output, such as when the data is going to a window or some other smaller subsection of the output display. From the scaling circuitry 55, the composited pixel data is propagated to its corresponding storage element in the frame buffer.

The display controller 50 also incorporates a BLT engine 56 which sends address requests down the bus 15 requesting blocks of pixel data from the memory to the graphic systems. The BLT engine should be one that is sufficiently adapted for handling video data as well as conventional graphics data. The BLT engine also is capable of requesting pixel data from the frame buffer and supplying the contents of the frame buffer storage elements to the CPU, blender or scaler for modifications or manipulations.

Finally, the display controller 50 includes timing logic 57 responsive to a crystal oscillator (not shown). The timing logic is critical when displaying motion video images because the CRT display and video have different optimum refresh rates. If the timing is not coordinated, it is possible that the display refresh could show the second half of an image, for example, from the frame buffer while only the first half of a previous image had been displayed thereby illustrating two different portions of different images. This is commonly referred to as "tearing problem". The timing logic synchronizes loading the frame buffer with the video and horizontal refresh periods and blanking time for the raster display. The frame buffer may be reloaded during vertical blanking, or loaded by following the rasterization process such that a storage element is changed only after it has been rendered.

Figure 5:
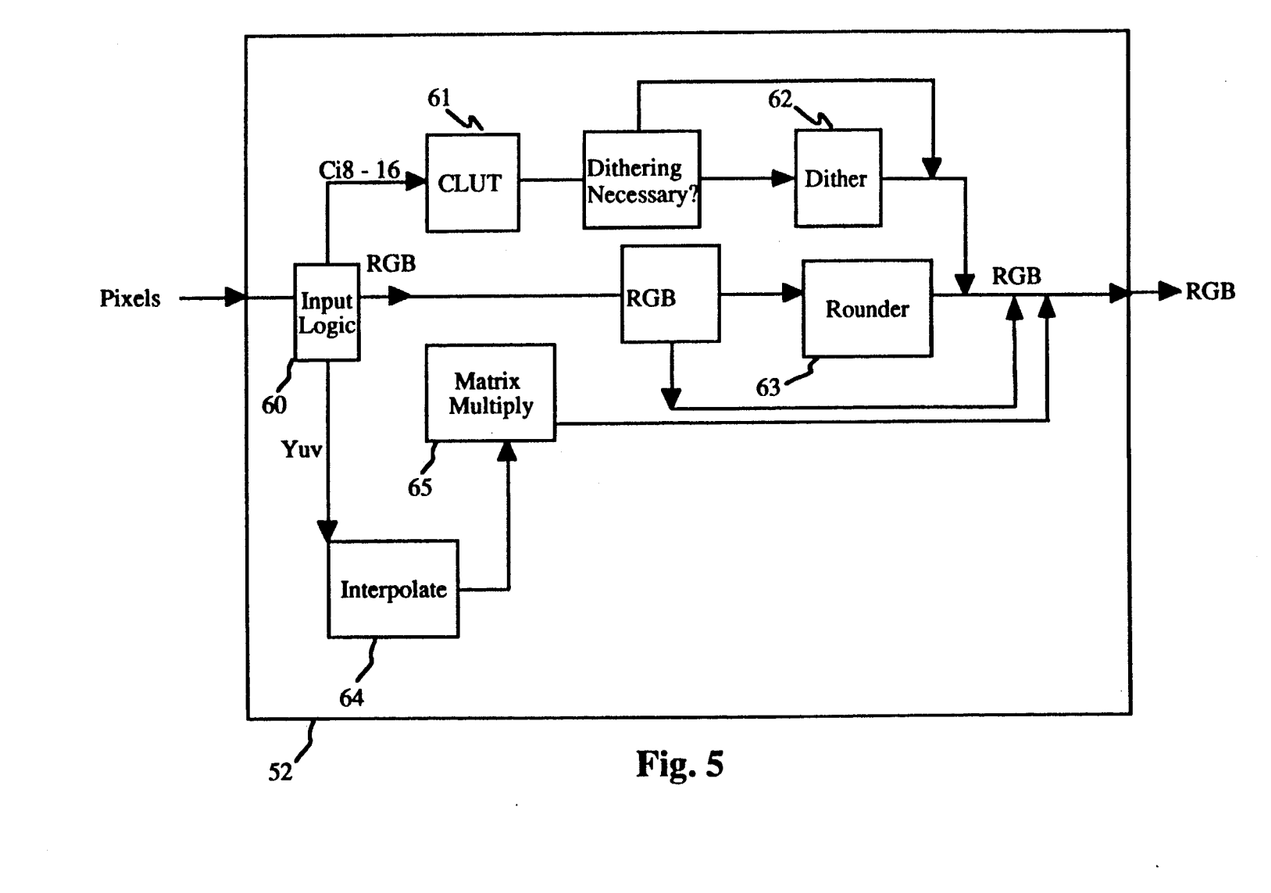
FIG. 5 is an expanded block diagram of the pixel conversion circuitry which is shown as a single block in FIG. 4.

FIG. 5 illustrates the conversion and dithering block 52 expanded to show its constituent modular elements. The conversion logic 52 first includes input logic 60. The input logic 60 determines the format type of incoming pixel data. This can be carried out by including, for example, a tag or some other identifying means with each block of pixel data. Based on the format type of the input pixel data, the input logic 60 routes the pixel data to the appropriate converting circuitry for translating to the desired output data type, which in the preferred embodiment case are RGB colors. For example, if the input data format is other than RGB, such as an index to a color lookup table (CLUT), the input logic 60 will route the input pixel data to the CLUT which maintains RGB color space values based on the index value. This is shown as CLUT 61 in FIG. 5. Occasionally, when using a CLUT with small pixel words (Ci8), it is necessary to color dither the output pixel blocks to approximate additional colors. Therefore, the conversion and color dithering module is equipped with dithering circuitry 62.

If for example, the input logic 60 detects that the incoming pixel data type is RGB16, indicating 16-bit color, the incoming graphics data will be processed by a rounder 63 translating RGB16 to 24-bit color RGB. Likewise, if the frame buffer's native format is RGB16 and the incoming pixel data type is RGB24, the rounder 63 is utilized to translate the RGB24 data to RGB16. Finally, if the input logic 60 determines that the incoming signal is video in the Yuv data format, the signal will be propagated to an interpolator 64 which undoes subsampling of the u and v components and then processed by matrix multiply circuitry 65 for converting the Yuv signal to RGB.

As can be seen, the architecture of the present design in accordance with the present invention yields a truly scalable and integrable display hardware system. If additional source pixel data types are developed or desired, only the conversion logic would need to be re-implemented. The frame buffer, digital-to-analog driver circuitry and display type need not be altered to accommodate such changes. Therefore, the present invention provides an efficient output display generation circuitry which is readily scalable to future requirements and minimizes the amount of memory required for frame buffers.

Although the present invention has been described in terms of a preferred embodiment and alternatives, it will be appreciated that various modifications and alterations might be made by those skilled in the art without departing from the spirit and scope of the invention. The invention should, therefore, be measured in terms of the claims which follow.

What is claimed is:

1. A computer display system for a computer, said computer having a memory system, a central processing unit (CPU) and a bus for conveying data, said memory system maintaining output data in a plurality of data types including graphical and video data formats, said display system comprising:

a display controller means coupled to said bus for receiving said output data to be displayed by said computer display system, said received data being in a plurality of data formats corresponding to the type of output image represented, said display controller means translating said output data received through said bus from said plurality of data formats to a predetermined display data format, said display controller means combining said output data into a composite stream of output image data to be utilized in a predetermined arrangement, said display controller means comprising:

data type conversion means having at least first and second color space conversion means for converting output data from a corresponding color space to said predetermined display data format;

logic means for receiving blocks of said output data from said bus in said plurality of data formats, each of said blocks of output data further providing data type identification for said block of output data corresponding to said color space of said block of output data, said logic means propagating a first block of output data to said first color space conversion means if said data type identification of said first block of output data indicates that said block of output data is in a data type corresponding to a first color space, said logic means propagating said first block of output data to said second color space conversion means if said data type identification of said first block of output data indicates that said block of output data is in a data type corresponding to said second color space;

blending means coupled to said data type conversion means and said bus for receiving output data in said graphical and video data formats and compositions said graphical and video data for determining which of said data will be stored; and timing means for synchronizing the writing of output image data from said display controller means, said timing means responsive to said computer output display such that output image data is not written out before previous image data has been rendered onto a computer output display;

frame buffer means coupled to said display controller means for receiving said stream of output image data after it has been translated to said predetermined display data format, said frame buffer means storing said output data in said predetermined display data format in accordance with said predetermined arrangement;

display generator means coupled to said frame buffer means for reading said output image data in said predetermined arrangement and generating analog signals corresponding to said output image data in said predetermined display format; and a computer output display coupled to said display generator means and responsive to said analog signals, said computer output display having a display screen and raster guns which follow a pattern along said display screen corresponding to said predetermined arrangement that said output image data is stored in said frame buffer, said raster guns being responsive to said analog signals from said display generator means for generating an image on said display screen corresponding to said output image data.

2. The computer display system of claim 1 wherein said display controller means further comprises scaling means coupled to said data type conversion means for translating said output image data in said predetermined display data format to output image data in said predetermined display data format corresponding to the size of the output image to be displayed on said computer output display.

3. The computer display system of claim 2 wherein said display controller means further comprises a BLT engine for requesting output data from particular addresses in said memory system or said frame buffer means to be processed by said computer display system.

4. The computer display system of claim 1 wherein said first color space conversion means comprises a color lookup table when said first block of output data comprises a color index, said color lookup table maintaining an index of values cross referencing color index data to corresponding data in said predetermined display data format, said color lookup table receiving said first block of data and outputting translated image data in said predetermined display data format.

5. The computer display system of claim 4 further comprising dithering means coupled to said color lookup table for receiving the translated image data from said color lookup table and color dithering the data when necessary.

6. The computer display system of claim 5 wherein said predetermined display data format comprises the color space data format RGB24.

7. The computer display system of claim 5 wherein said predetermined display data format comprises the color space data format RGB16.

8. The computer display system of claim 1 wherein said first color space conversion means comprises a rounder when said first block of output data is in the RGB16 color space data type and said predetermined display data format is the RGB24 color space format, said rounder yielding RGB24 output image data.

9. The computer display system of claim 1 wherein said first color space conversion means comprises a rounder when said first block of output data is in the RGB24 color space data type and said predetermined display data format is the RGB16 color space format, said rounder yielding RGB16 output image data.

10. The computer display system of claim 1 wherein said first color space conversion means comprises means for translating output data from a video data type to a graphics color space data format.

11. The computer display system of claim 10 wherein said means for converting from said video data type to said graphical color space comprises matrix multiplier circuitry for applying the transformation to the video data type for yielding the graphical color space data.

12. The computer display system of claim 11 wherein said means for converting from video to graphics further comprises interpolation circuitry means for processing subsampled components of said video data type.

13. In a computer system having a raster display, a frame buffer for storing image data in a single data format, a digital-to-analog converter for translating digital data from the frame buffer to analog control signals for driving the raster display, said computer having a CPU and a memory system, a frame buffer controller comprising:

means for receiving graphics and video data from said bus;

at least first and second color space conversion means for converting said graphics and video data from a corresponding color space to a single data type for storage in said frame buffer;

logic means for receiving said graphics and video data from said bus in a plurality of data types, each piece of said graphics and video data further providing data type identification corresponding to said color space of said data, said logic means propagating a first block of output data to said first color space conversion means if said data type identification indicates that said block of output data is in a data type corresponding to a first color space, said logic means propagating said first block of output data to said second color space conversion means if said data type identification indicates that said block of output data is in a data type corresponding to said second color space;

means for blending said graphics and video data; and timing means for synchronizing output to the frame buffer to coordinate writing of video and graphic information.

14. The frame buffer controller of claim 13 wherein said first color space conversion means comprises a color lookup table when said first block of output data comprises a color index, said color lookup table maintaining an index of values cross referencing color index data to corresponding values in said single data type, said color lookup table receiving said first block of data and outputting translated image data in said single data type.

15. The frame buffer controller of claim 14 further comprising dithering means coupled to said color lookup table for receiving the translated image data from said color lookup table and color dithering the data when necessary.

16. The frame buffer controller of claim 13 wherein said single data type comprises the color space data format RGB24.

17. The frame buffer controller of claim 13 wherein said single data type comprises the color space data format RGB16.

18. The frame buffer controller of claim 13 wherein said first color space conversion means comprises a rounder when said first block of output data is in the RGB16 color space data type and said single data type is the RGB24 color space format, said rounder yielding RGB24 output image data.

19. The frame buffer controller of claim 13 wherein said first color space conversion means comprises a rounder when said first block of output data is in the RGB24 color space data type and said single data type is the RGB16 color space format, said rounder yielding RGB16 output image data.

20. The frame buffer controller of claim 13 wherein said first color space conversion means comprises means for translating output data from a video data type to a graphics color space data format.

21. The frame buffer controller of claim 17 wherein said means for converting from video to graphics further 22. The frame buffer controller of claim 20 wherein said means for converting from said video data type to said graphical color space comprises matrix multiplier circuitry for applying the transformation to the video data for yielding the graphical color space data. comprises interpolation circuitry means for processing sub sampled components of said video data.

* * * * *

UNITED STATES PATENT AND TRADEMARK OFFICE
CERTIFICATE OF CORRECTION

PATENT NO. : 5,243,447
DATED : September 7, 1993
INVENTOR(S) : Jens Bodenkamp, et al It is certified that error appears in the above-indentified patent and that said Letters Patent is hereby corrected as shown below:

Claim 21, Line 3   After "further" Insert --comprises interpolation circuitry means for processing sub sampled components of said video data.--

Claim 22, Line 5   After "data." Delete "comprises interpolation circuitry means for processing sub sampled components of said video data."

Signed and Sealed this

Eighth Day of August, 1995

Attest:

BRUCE LEHMAN

Attesting Officer

Commissioner of Patents and Trademarks